United States Patent [19]
Kubik

[11] 3,952,513
[45] Apr. 27, 1976

[54] VARIABLE SPEED AND TORQUE FEED SYSTEM

[76] Inventor: Philip A. Kubik, 251 Minnesota, Troy, Mich. 48084

[22] Filed: Jan. 6, 1975

[21] Appl. No.: 538,808

[52] U.S. Cl. .................................. 60/435; 60/444; 60/446
[51] Int. Cl.² ..................... F16H 39/46; F15B 11/02
[58] Field of Search ............ 60/369, 381, 382, 383, 60/387, 425, 435, 444, 446, 465

[56] References Cited
UNITED STATES PATENTS

| | | | |
|---|---|---|---|
| 2,493,512 | 1/1950 | Vickers | 60/446 X |
| 3,653,208 | 4/1972 | Kubik | 60/444 |
| 3,713,291 | 1/1973 | Kubik | 60/383 X |

Primary Examiner—Edgar W. Geoghegan
Attorney, Agent, or Firm—Basile and Weintraub

[57] ABSTRACT

A fluid system having a variable displacement fluid pump connected in a closed-loop fashion to a pair of inlet ports of a fluid motor of the type having two output shafts and a fluid pressure responsive means operable upon communication with fluid pressure through said inlet ports to translate said fluid pressure to one of the output shafts in the form of a high torque output while rotating one shaft at a low speed. The fluid pressure responsive means of the fluid motor is further operable to translate fluid pressure to the other of the drive shafts in the form of a low torque output while rotating the other shaft at a high speed. Suitable clutching means responsive to selective operation of the system are provided for alternate and independent coupling of the motor output shafts to a common system drive shaft to provide an output of which the speed and torque may be selectively varied from a high speed-low torque output to a high torque-low speed output.

5 Claims, 2 Drawing Figures

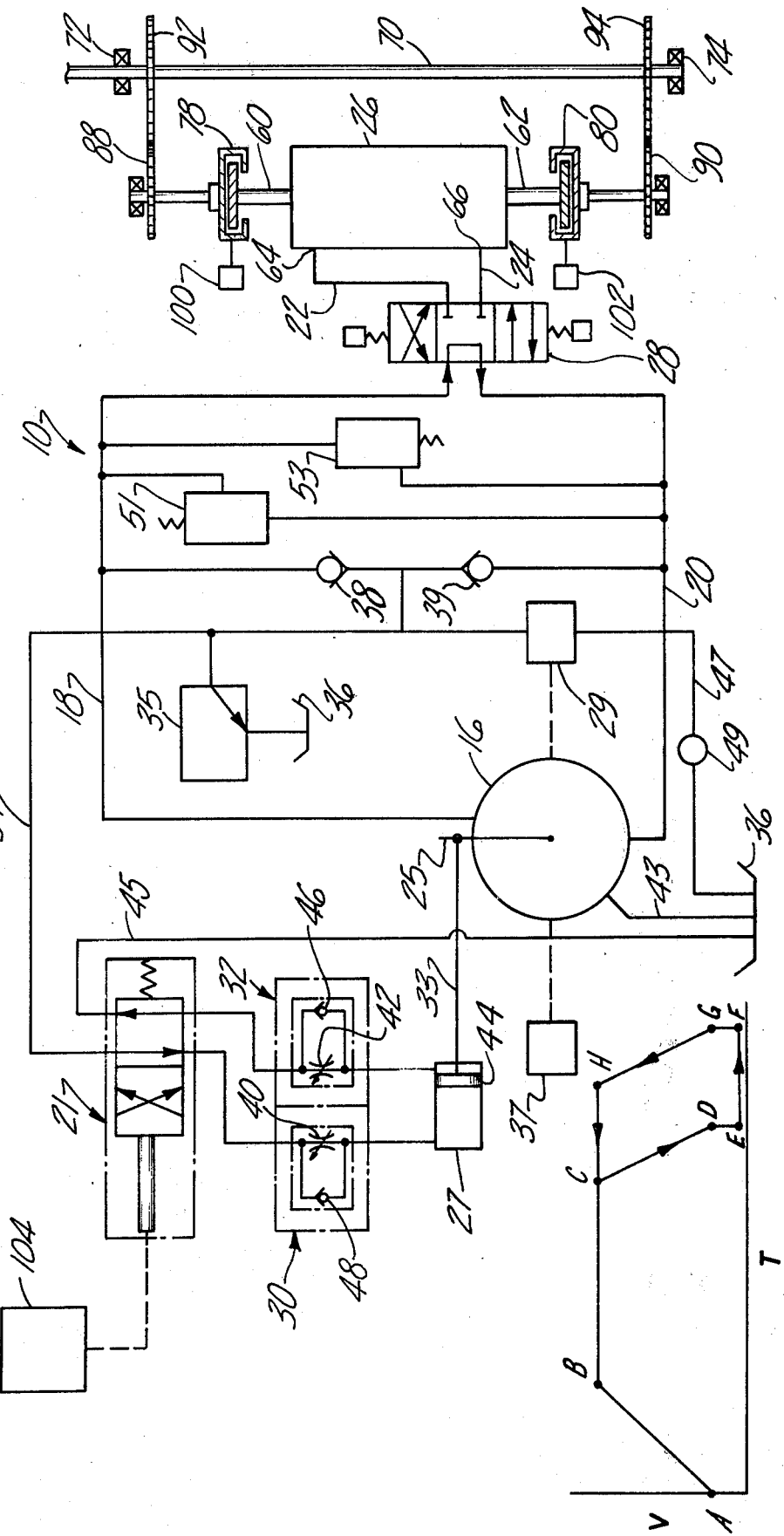

VARIABLE SPEED AND TORQUE FEED SYSTEM

BACKGROUND OF THE INVENTION

I. Field of the Invention

The present invention relates to fluid systems for controlling the rotation of a drive shaft and the rate of rotation of such a drive shaft and, in particular, the present invention relates to a variable speed and torque feed system.

II. Description of the Prior Art

Heretofore, numerous systems have been employed for the purposes of providing output systems having variable speed and variable torque capabilities and examples of such systems are disclosed in U.S. Pats. No. 1,951,211, No. 1,951,875, No. 2,170,365, No. 2,249,873, No. 2,356,590, No. 3,127,790 and No. 3,702,051. While each of these systems attempts to provide a drive system having variable torque and speed capabilities, none achieves an optimum situation of the type proposed and disclosed in the present application.

SUMMARY OF THE INVENTION

The present invention which will be described subsequently in greater detail, comprises a fluid system having a fluid motor with two output shafts which are driven in response to fluid pressure. One of the output shafts is adapted to transmit a high torque at low speed while the other output shaft rotates at a high speed and transmits a low torque. Suitable clutching mechanisms are provided for each output shaft to connect the output shafts to a common system such that the system shaft may selectively transmit a high speed-low torque output or a low speed-high torque output.

It is therefore an object of the present invention to provide a new and improved fluid system having a variable speed and torque output.

It is another object of the present invention to provide such a fluid system which is particularly adaptable for use in conjunction with feed systems where rapid traverse with low force and a slow constant feed rate with a high force is required.

Other objects, advantages and applications of the present invention will become apparent to those skilled in the art of fluid systems when the accompanying description of one example contemplated for practicing the invention is read in conjunction with the accompanying drawing.

BRIEF DESCRIPTION OF THE DRAWING

The description herein makes reference to the accompanying drawing wherein:

FIG. 1 represents a schematic illustration of one example of a fluid system constructed in accordance with the principles of the present invention, and FIG. 2 is a diagram illustrating an example of the velocity-time characteristics of a fluid system of the type illustrated in FIG. 1.

DESCRIPTION OF THE PREFERRED EMBODIMENT

Referring now to the drawings and, in particular, to FIG. 1 wherein there is illustrated a fluid system 10 constructed in accordance with the principles of the present invention and comprising a variable displacement fluid pump 16 connected in a closed-loop manner by conduits 18, 20, 22 and 24 to a rotary fluid motor 26. Incorporated within the system 10 is a conventional four way solenoid operated, spring centered, directional flow control valve 28 which is adapted to connect the conduits 18 and 20, selectively, to the conduits 22 and 24, or to be positioned tandem-center to allow communication between the conduits 18 and 20, but prevent fluid communication between and with the conduits 22 and 24.

The fluid pump 16 may be any suitable variable displacement fluid pump such as a pump disclosed in U.S. Pat. No. 3,653,208 which describes this type of pump in greater detail. The amount of fluid displaced by the fluid pump 16 is controlled by an internal displacement control mechanism which may be varied between minimum and maximum flow positions by an external lever 25 operated by a control fluid cylinder 27.

In the schematic example of FIG. 1, the pump 16 is considered for purposes of explanation to be at a minimum displacement or minimum flow position when the lever 25 is rotated clockwise and is considered to be in a maximum displacement or maximum flow position when the lever 25 is rotated counterclockwise by the action of the control cylinder 27. The shifting of the lever 25 between the minimun and maximum flow positions or the positioning of the same in any intermediate flow position and the rate at which the lever 25 is so shifted controls the amount of and the rate at which fluid is displaced by the fluid pump 16. This operation, in turn, controls the amount of and the rate at which fluid is directed to the motor 26.

An example of one means for controlling the displacement of the variable displacement fluid pump 16 comprises a directional control valve 21 adapted to selectively communicate a control fluid maintained at a constant pressure from an auxiliary pump 29 via a conduit 34 to either of a pair of feed control valves 30 or 32 which, in turn, are respectively connected to the ports of the fluid cylinder 27 by any suitable conduits or the like. The fluid cylinder 27 is conventional in its construction having a fluid piston 44 with a connecting rod 33 that extends therefrom for coupling with the pump lever 25. A conventional pressure relief valve 35 communicates with the auxiliary pump conduit 34 and functions in a conventional manner to limit the pressure of the fluid being delivered from the auxiliary pump 29. A prime mover, such as an electric motor, schematically illustrated at 37 is mechanically connected through a suitable coupling to the drive shaft of the fluid pump 16 which, in turn, drives the auxiliary pump 29 through a similar mechanical connection. The fluid pump 16 communicates with a fluid reservoir 36 through a conduit 43.

The feed control valves 30 and 32 are conventional in their construction having restricted passages 40 and 42, respectively, which are adjustable such that the feed control valves may be preset to supply any determined rate of flow over any desired range. The feed control valves 30 and 32 further comprise, respectively, check valves 48 and 46 which permit flow to by-pass the restricted passages 40 and 42, respectively, in one direction of flow. Thus, when the control valve 21 is in the position indicated, fluid flow is directed from the auxiliary pump 29 through the feed valve 30 via check valve 48 and is communicated to one side of the fluid cylinder 27 where it exerts a force on the piston 44 to shift the same rightwardly, and thus, displace the lever 25 towards the aforementioned minimum flow position. At the same time, the fluid on the opposite side of the piston 44 is exhausted from the fluid cylinder 27 via the restricted passageway 42 in the feed valve 32 and returned to the reservoir 36 via control valve 21 and a return conduit 45. When the direction of the control valve 21 is reversed to direct fluid through the check valve 46 of the feed control valve 32, fluid is communicated to the pressure chamber on the opposite side of the fluid cylinder piston 44 whereupon fluid pressure exerts a force against the piston 44 to shift the same leftwardly as viewed in FIG. 1 to increase the displacement of the fluid pump 16 toward a maximum flow condition while at the same time fluid on the opposite side of the piston 44 is exhausted through the restricted passage 40 of the feed control valve 30 and returned to the reservoir 36 via the directional control valve 21 and conduit 45.

The auxiliary pump 29, which may be of any suitable pump such as a gear pump, is in communication with the reservoir 36 through a supply conduit 47 and a filter 49 for supplying a replenishing fluid to the conduits 18 and 20, respectively, by means of the aforementioned spring biased check valves 38 and 39, both of which function in a well known manner to replenish the fluid system.

Upstream from the directional control valve 28, the conduits 18 and 20 are, respectively, connected to the inlets of high pressure relief valves 51 and 53 which, at a predetermined pressure, for example 3000 PSI, will exhaust the fluid pressure from one of the conduits to the other conduit to prevent damage to the system in the event of over pressurization.

The fluid motor 26 is of the type having an internal mechanism which is operable in response to fluid presure communicated thereto to drive two output shafts 60 and 62 when fluid under pressure is communicated to the fluid motor 26 via inlet ports 64 and 66. The fluid motor 26, which is of a type that is commercially available, is adapted to transmit a rotary motion to the two shafts 60 and 62 to rotate them in one direction when fluid under pressure is communicated to the inlet port 64 via the conduit 22 while the internal mechanism of the fluid motor 26 is adapted to reverse the direction of rotation of the output shafts 60 and 62 when fluid under pressure is communicated to the inlet port 66 via the conduit 24 when directional control valve 28 is shifted in the aforementioned manner.

The system 10 further comprises a main system output shaft 70 which is schematically illustrated as being mounted for rotation on bearing supports 72 and 74. The main output shaft 70 is adapted to be connected through suitable gears and the like to form the motive force for a feed system. The feed system is generally of the type which requires the movement of a tool, such as a drill, from an initial position towards a workpiece upon which an operation is to be performed and the withdrawal of the tool back to its initial position after performing the operation on the workpiece so that the same may be removed and a new workpiece brought into position for operation thereon by the tool.

In such feed systems it is desirable to move the tool from its initial position as rapidly as possible, and thus, as shown schematically in FIG. 2, the movement of the tool is accelerated from its initial position A to a position B wherein the tool is being moved at maximum velocity toward the workpiece. At an intermediate point (C) the tool is decelerated in velocity down to its minimum velocity D at which time the tool engages the workpiece upon which an operation is to be performed such as drilling or boring in a workpiece. The tool advances at a very low velocity (but at a high force which is necessary in such drilling operations) until the operation is completed at point E whereupon the tool is withdrawn by being accelerated to position F and moved at a maximum velocity to position B whereupon the tool is decelerated and moved to its initial starting position A.

In order to obtain the high degree of accurate control necessary to rapidly accelerate a tool carriage and rapidly decelerate a tool carriage to its working position at D and then provide the necessary low speed and high feed torque necessary to perform the drilling operation with the subsequent ability to withdraw the tool carriage and return it to its starting position A, it is necessary to have a system which provides both variable speed and feed torque control.

To this end, the motor 26 has its output shafts 60 and 62, respectively, connected to the main system output shaft 70 by means of clutching mechanisms 78 and 80, the outputs of which are connected to suitable gearing 88 and 90 which, in turn, mesh with gearing 92 and 94 carried on the main output shaft 70.

Suitable control devices are provided at 100 and 102 for, respectively, actuating the engagement and disengagement of the clutch mechanisms 78 and 80 such that when the clutch mechanism 78 is engaged, the clutch mechanism 80 is disengaged and vice versa. When the clutch mechanism 78 is engaged, the high speed-low torque output shaft 60 is in a driving relationship via gears 88 and 92 with output shaft 70, and thus, the output shaft 70 is rotated at a high speed while providing a low torque output. When the control device 100 is operable to deactivate the clutching mechanism 78, the control device 102 is simultaneously operable to actuate the clutching mechanism 80 to engage the low speed-high torque output shaft 62 with the gears 90 and 94 to transmit a low speed-high torque output to the drive shaft 70.

In use, when the tool carriage (which is desired to be moved in order to have the tool carried thereby perform an operation on a workpiece) is at position A, as shown in FIG. 2, the valve 21 is shifted by suitable control means 104 to direct fluid under pressure through the feed control valve 32 to cylinder 27 to exert a force on the piston 44 to shift the piston 44 leftwardly as viewed in FIG. 1. This movement shifts the variable displacement pump 16 to a maximum flow position whereby fluid from the pump 16 is delivered under pressure via conduit 18 to the directional control valve 28 which has been shifted to direct fluid under pressure via conduit 22 to the inlet port 64 of the fluid motor 26 to drive both output shafts 60 and 62. Simultaneously with the actuation of the valve 21 and 28, control devices 100 and 102, respectively, become operable to engage the output shaft clutch mechanism 78 and disengage output shaft clutch mechanism 80 so that the high speed-low torque output shaft 60 is driving the main output shaft 70 whereupon a high speed-low torque capability is available to drive the tool from points A to D (FIG. 2). The main shaft 70 will accelerate to point B at which time the maximum transversing speed of the system will have been reached. The system will continue to operate at this maximum speed until the point C has been reached whereupon the valve 21 will be shifted to communicate fluid under pressure from the auxiliary pump 29 via control valve 30 to the opposite side of the piston 44 to drive the piston 44 rightwardly and thus, to rotate the displacement control lever 25 of the pump 16 toward a minimum position thereby decelerating the rate at which fluid is delivered to the motor 26. Thus the speed of rotation of the output shaft 70 is decelerated until the speed of the output shaft 70 has reached the point D at which time output shaft clutch mechanism 78 is disengaged by the action of the control device 100 and simultaneously output shaft clutch mechanism 80 is activated by the control device 102 such that the low speed-high torque output shaft 62 is coupled to and driving the main output shaft 70. In this mode the output of the system 10 is a high torque-low speed output (D to E) and the tool carriage may function to perform its operation on the workpiece until the tool carriage reaches the position F whereupon the control device 102 is operable to disengage the clutch mechanism 80. The directional control valve 28 is then actuated to communicate fluid under pressure from conduit 18 to conduit 24 to the inlet port 66 of the fluid motor 26 whereby the direction of rotation of the output shafts 60 and 62 is reversed. The control device 100 is then actuated to engage the drive shaft clutch mechanism 78 whereby the high speed-low torque shaft 60 is again mechanically coupled to the main system shaft 70 to withdraw the tool from the workpiece to the point G. At the same time, the solenoid operated directional control valve 21 is shifted to communicate fluid via feed control valve 32 to the cylinder 12 to shift the pump 16 to a maximum flow position thereby accelerating the system to maximum velocity at point H. When the tool reaches point B, deceleration takes place by the shifting of the directional control valve 21 and the communication of fluid under pressure via feed control valve 30 to the cylinder 27 to displace the pump 16 towards a minimum position.

When the tool reaches point A, the directional control valve 28 is de-energized, that is, the valve 28 is shifted to the neutral position illustrated in FIG. 1.

It can thus be seen that the present invention provides a new and improved system wherein a variable speed and variable torque output is provided in a simple manner which results in the accurate and easily controlled output for particular use in a feed system.

It should also be understood that the various elements of the present system are for illustrative purposes only and that other forms may be had all coming within the spirit of the present invention and the scope of the appended claims.

What is claimed is as follows:

1. A rapid traverse and feed device comprising a fluid motor having two output shafts and a common fluid pressure responsive means operable upon communication with fluid pressure to translate said fluid pressure to one of said shafts in the form of a high torque output while rotating said one shaft at a low speed, said fluid pressure responsive means being operable to translate fluid pressure to the other of said shafts in the form of a low torque output while rotating said other shaft at a high speed; means for communicating fluid pressure to said fluid pressure responsive means; a system drive shaft; and means for alternate, independent coupling of said two output shafts to said drive shaft to permit the selective and independent driving of said system drive shaft selectively at high and low output torques and with variable speed control.

2. The device defined in claim 1 further comprising first and second clutch means respectively carried by said one and said other output shafts and means operable upon actuation for engaging said first clutch means while disengaging said second clutch means and second means operable upon actuation for engaging said second clutch means while disengaging said first clutch means.

3. The device defined in claim 2, further comprising a fluid pump having inlet and outlet means;
   said fluid motor having a pair of fluid ports, one of which when communicated to fluid pressure from said pump results in said output shaft rotating in a first direction, the other of said fluid ports when communicated to fluid pressure from said pump resulting in said output shaft rotating in an opposite direction; and
   means selectively operable to connect said pump inlet and outlet means to said pair of ports on said fluid motor whereby the direction of rotation of said output shafts may be selectively controlled.

4. The device defined in claim 3 wherein said inlet and outlet means of said fluid pump are connected in a closed-loop fashion with said motor.

5. The device defined in claim 4 wherein said fluid pump is of variable displacement type further comprising pressure responsive means for varying the displacement of said pump; an independent source of pressure adapted to be selectively communicated to said pressure responsive means for varying the displacement of said variable pump such that the rate of acceleration and deceleration of said output shafts of said fluid motor may be selectively varied.

* * * * *